(12) United States Patent
Mukhopadhyay et al.

(10) Patent No.: US 11,893,380 B2
(45) Date of Patent: Feb. 6, 2024

(54) SUPER BUNDLES FOR SOFTWARE-DEFINED DATACENTER UPGRADES

(71) Applicant: VMware LLC, Palo Alto, CA (US)

(72) Inventors: Sudipto Mukhopadhyay, Palo Alto, CA (US); Swapneel Ambre, Palo Alto, CA (US); Mao Ye, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 178 days.

(21) Appl. No.: 16/453,442

(22) Filed: Jun. 26, 2019

(65) Prior Publication Data

US 2020/0409691 A1  Dec. 31, 2020

(51) Int. Cl.
*G06F 8/658* (2018.01)
*G06F 8/71* (2018.01)
*H04L 67/1097* (2022.01)
*G06F 9/50* (2006.01)
*G06F 8/61* (2018.01)

(52) U.S. Cl.
CPC ............... *G06F 8/658* (2018.02); *G06F 8/63* (2013.01); *G06F 8/71* (2013.01); *G06F 9/5072* (2013.01); *H04L 67/1097* (2013.01)

(58) Field of Classification Search
CPC ... G06F 12/00; G06F 8/63; G06F 8/71; G06F 9/5072; G06F 8/658; H04L 67/1097
USPC ........................................................ 711/168
See application file for complete search history.

(56) References Cited

U.S. PATENT DOCUMENTS

| | | | |
|---|---|---|---|
| 10,572,108 B2 | 2/2020 | Bonchev | |
| 10,802,815 B1* | 10/2020 | Wang | G06F 8/65 |
| 2015/0142728 A1* | 5/2015 | Nigam | G06F 8/65 |
| | | | 707/609 |
| 2015/0378712 A1* | 12/2015 | Cameron | G06F 3/04842 |
| | | | 717/169 |
| 2016/0139915 A1* | 5/2016 | Dimitrakos | G06F 9/5011 |
| | | | 717/126 |
| 2017/0060570 A1* | 3/2017 | Miller | G06F 8/71 |

* cited by examiner

Primary Examiner — Gautam Sain
(74) Attorney, Agent, or Firm — King Intellectual Asset Management (57) ABSTRACT

Examples described herein include systems and methods for efficiently and effectively applying upgrade bundles to an SDDC. The upgrade bundles can update various software components of the SDDC. A version-compliance configuration matrix provides version-compliance information across various software components to ensure that all components function properly after upgrading. Each upgrade bundle can include metadata that provides information sufficient to utilize the configuration matrix. A super bundle can include multiple upgrade bundles, as well as instructions for applying the multiple upgrade bundles in a particular order to avoid compatibility issues. The super bundle can be used to upgrade multiple software components of an SDDC without disrupting the functionality of the SDDC.

17 Claims, 6 Drawing Sheets

SUPER BUNDLES FOR SOFTWARE-DEFINED DATACENTER UPGRADES

BACKGROUND

In a software-defined data center ("SDDC"), infrastructure elements are virtualized and delivered as a service. Networking, storage, processing, and security functions can execute as virtualized components on top of physical hardware devices, such as servers. An SDDC can span one or more clouds. By virtualizing aspects of a regular data center, an SDDC can allow for easier and more flexible deployments that scale according to company or client needs.

SDDCs require continual updating of the various software components within the SDDC. This process is generally referred to as lifecycle management or lifecycle orchestration. Different components of the SDDC can include different types of software, therefore requiring different upgrade packages. But because various software components of an SDDC must sometimes work together, upgrading a component can break compatibility with another component. Typically, an SDDC administrator must carefully study and manage component dependencies in order to upgrade components in a manner that retains compatibility with other components. As the number of components and available versions grow, the task of managing upgrades can become overwhelming. These drawbacks can result in decreased efficiency, outdated software, and broken SDDC systems.

A need therefore exists for an efficient mechanism for managing component dependencies and applying upgrades to an SDDC in a manner that retains functionality of the SDDC without requiring much, if any, work from an SDDC administrator.

SUMMARY

Examples described herein include systems and methods for efficiently and effectively applying upgrades to an SDDC. More specifically, examples described herein relate to upgrade bundles that can include a software upgrade package for a software component of an SDDC. The examples further describe a version-compliance configuration matrix that identifies various acceptable combinations of software components and versions. The examples also describe a super bundle that includes multiple upgrade bundles and instructions for applying the bundles in an appropriate manner.

An example method for lifecycle orchestration in an SDDC is provided. The example method can include receiving, at an SDDC manager, a super bundle that includes multiple upgrade bundles. An SDDC manager can be one or more software applications running on one or more virtual machines on top of the virtual infrastructure that it is managing. In other words, the SDDC manager can be a component of the SDDC that it manages. The SDDC manager can run within a standalone SDDC manager instance with storage, compute, and networking components. The SDDC manager instance can also include components for supporting authentication, log aggregation and analysis, monitoring, automated performance management, cloud planning, and capacity optimization. The SDDC manager, as that term is used herein, can refer to the software applications, the SDDC manager instance running those applications, or the combination thereof.

The SDDC manager can create and delete additional SDDC workload instances. Each SDDC workload instance can be an SDDC instance with its own storage, compute, and network isolation (micro-segmentation and security). The SDDC manager can be responsible for lifecycle management of the various SDDC workload instances, such as by upgrading the various software components on those instances. Together, the SDDC manager and various SDDC workload instances can be considered an SDDC, as that term is used herein.

The super bundle received by the SDDC manager can identify multiple SDDC elements and corresponding versions for installation. For example, it can include a first bundle identifying a first SDDC element and a first version, as well as a second bundle identifying a second SDDC element and a second version. The terms "first version" and "second version" are used merely to distinguish different versions from one another and are not intended to identify or be limited to a particular version. Moreover, the first and second SDDC elements can be any software elements within the SDDC, such as software components within an SDDC workload instance or within the SDDC manager instance. The first and second SDDC elements can also be located at different locations, such as on different clouds within different SDDC workload instances, in another example.

The example method can further include determining a bundle sequence that identifies which of the first and second bundles to apply first, based on the super bundle. For example, the super bundle can include a metadata manifest that describes the first and second bundles and includes sequence numbers for the bundles. Determining the bundle sequence can include identifying upgrade needs for the first and second SDDC elements, such as by determining whether the elements are present in the SDDC and, if so, if they are up to date. It can also include identifying the first and second bundles based on the identified upgrade needs, such as by mapping the SDDC component in need of an upgrade to the bundle that corresponds to that SDDC component. This stage can also include making API calls from the SDDC manager to the SDDC workload instances. Determining the bundle sequence can further include extracting sequence information from the super bundle to determine which of the first and second bundle to apply first.

The example method can also include, based on the bundle sequence, causing a first orchestrator to apply the first bundle before a second orchestrator applies the second bundle. An orchestrator can be a software management component running within a particular SDDC instance, such as an SDDC workload instance. The orchestrator for that instance can apply upgrades to components within the instance. In some examples, the first and second orchestrator are running in the same SDDC workload instance, while in other examples the orchestrators are running in different instances. The orchestrators can apply the respective bundles based on instructions from the SDDC manager.

Applying the bundles within the super bundle can also include validating the versions of the relevant SDDC elements against a compliance matrix to check interoperability with other SDDC elements. This can include projecting future versions of SDDC elements based on the bundle sequence identified previously. The compliance matrix can include various validated configurations that identify groups of SDDC elements and their respective versions that are known to work together. If an upgrade bundle would result in a configuration that is not contained in the compliance matrix, the orchestrator or SDDC manager can block the upgrade bundle from being applied to the relevant SDDC element. Each bundle can include a metadata manifest with information necessary to validate the bundle against the compliance matrix.

While two bundles within a super bundle have been described in this example, any number of bundles can be applied using similar functionality. Additionally, the examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for efficiently and effectively applying upgrade bundles to an SDDC. The upgrade bundles can update various software components (also referred to herein as an "SDDC elements," "SDDC software elements," or "SDDC software components") of the SDDC. A version-compliance configuration matrix provides version-compliance information across various software components to ensure that all components function properly with each other after upgrading. Each upgrade bundle can include metadata that provides information sufficient to utilize the configuration matrix. A super bundle can include multiple upgrade bundles, as well as instructions for applying the multiple upgrade bundles in a particular order to avoid compatibility issues. The super bundle can be used to upgrade multiple software components of an SDDC without disrupting the functionality of the SDDC.

Figure 1A:
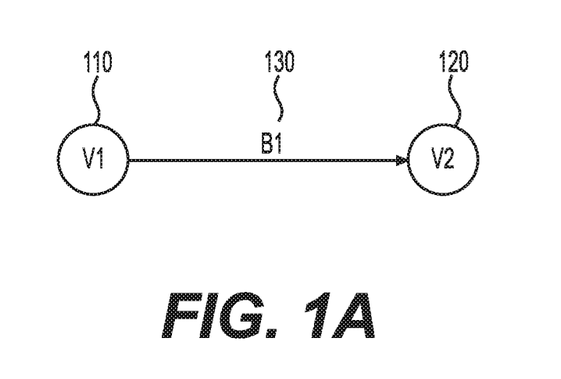
FIG. 1A is an illustration of an example bundle that can upgrade an SDDC element from a first version to a second version.

FIG. 1A is an illustration of an example upgrade bundle (B1) 130 for upgrading an SDDC software element from a first version (V1) 110 to a second version (V2) 120. The arrow between the two versions (V1, V2) 110, 120 indicates the direction of the upgrade. As described in more detail later, an orchestrator at the SDDC can receive the bundle (B1) 130. The orchestrator can then confirm that applying the bundle would not fall outside the bounds set forth in a compliance matrix (described with respect to FIG. 2). The orchestrator can then apply the upgrade bundle (B1) 130, upgrading the SDDC software element from V1 to V2.

In some examples, the upgrade bundle (B1) 130 can only be applied to a particular version of the SDDC software element. For example, upgrade bundle (B1) 130 can be configured to apply only to version V1 of the SDDC software element, upgrading the element from version V1 to V2. In that example, the same upgrade bundle (B1) could not be applied to a different version of the same element. This is illustrated in more detail by FIG. 1B.

Figure 1B:
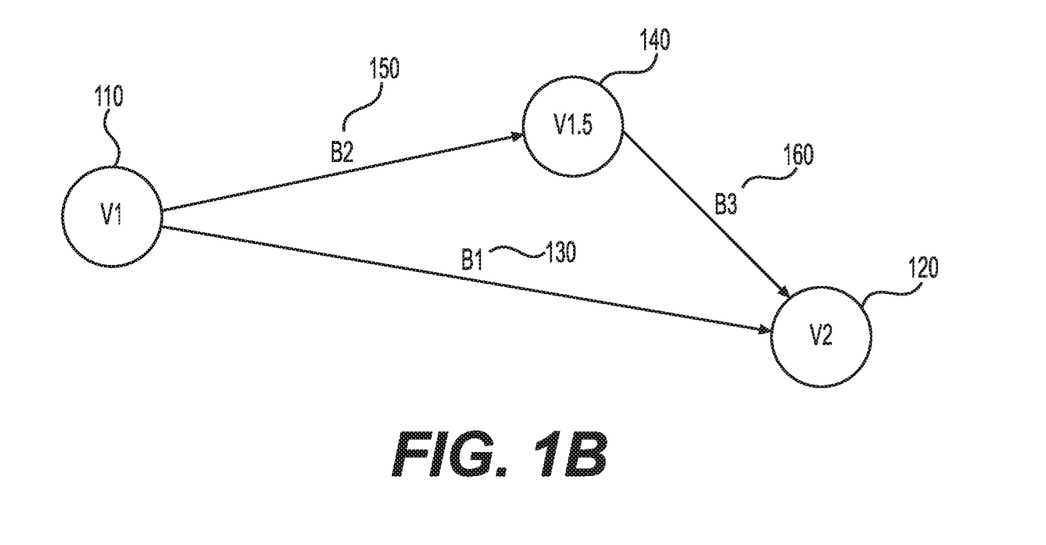
FIG. 1B is an illustration of various example bundles that can upgrade SDDC elements in various ways.

FIG. 1B is an illustration of several example upgrade bundles that can apply to different versions of an SDDC software element. FIG. 1B shows the same initial version (V1) 110 for the SDDC software element. Two upgrades paths are shown to take the element from version V1 110 to version V2 120. In one example, upgrade bundle B1 can be applied to version V1 of the SDDC software element, upgrading it directly to version V2, as also shown in FIG. 1A.

In another example upgrade path, the SDDC software element can be upgraded from V1 to V1.5 to V2. In that example, two upgrade bundles (B2, B3) 150, 160 can be applied to upgrade the element to version V2. Specifically, upgrade bundle B2 150 can be applied to upgrade version V1 to version V1.5, while upgrade bundle B3 160 can be applied to upgrade version V1.5 to version V2. As mentioned above, in some examples each bundle can only be applied to a particular beginning version of the SDDC element. In other words, after applying bundle B2 150 to upgrade the element from V1 to V1.5, bundle B1 130 can no longer be applied to the element. This is because, in this example, bundle B1 130 is only applicable to version V1 of the element. Therefore, a different bundle (B3) 160, specific to version V1.5, is required to upgrade the element from V1.5 to V2.

FIGS. 1A and 1B highlight the basics of applying bundles to upgrade a single SDDC element from one version to another. Each bundle can be configured to apply to a particular beginning version and upgrade it to a particular final version. In some examples, the bundles must be applied in a specific order to achieve the desired result. For example, in order to upgrade an SDDC element from V1 to V1.5 to V2, bundle B2 must be applied before bundle B3. The bundles could not be applied in the reverse order in that example.

While FIGS. 1A and 1B relate to a single SDDC element, a given SDDC can have multiple SDDC elements with various interdependencies with respect to one another. For example, the SDDC element described in FIGS. 1A and 1B can be referred to as "S1," which a second SDDC element (not shown) can be referred to as "S2." S1 can be upgraded from V1 to V2 directly, or it can be upgraded from V1 to V1.5 to V2. S2 can be upgraded from V4 to V5 to V6. In this example, S1:V1.5 is not compatible with S2:V4 but is compatible with S2:V5. Therefore, in order to upgrade both SDDC elements to the most recent versions, an SDDC manager can cause S2 to be upgraded from V4 to V5, then upgrade S1 from V1 to V1.5, then upgrade S2 from V5 to V6, and finally upgrade S1 from V1.5 to V2. This example is merely provided to highlight how the element interdependencies can affect the upgrade process.

Figure 2:
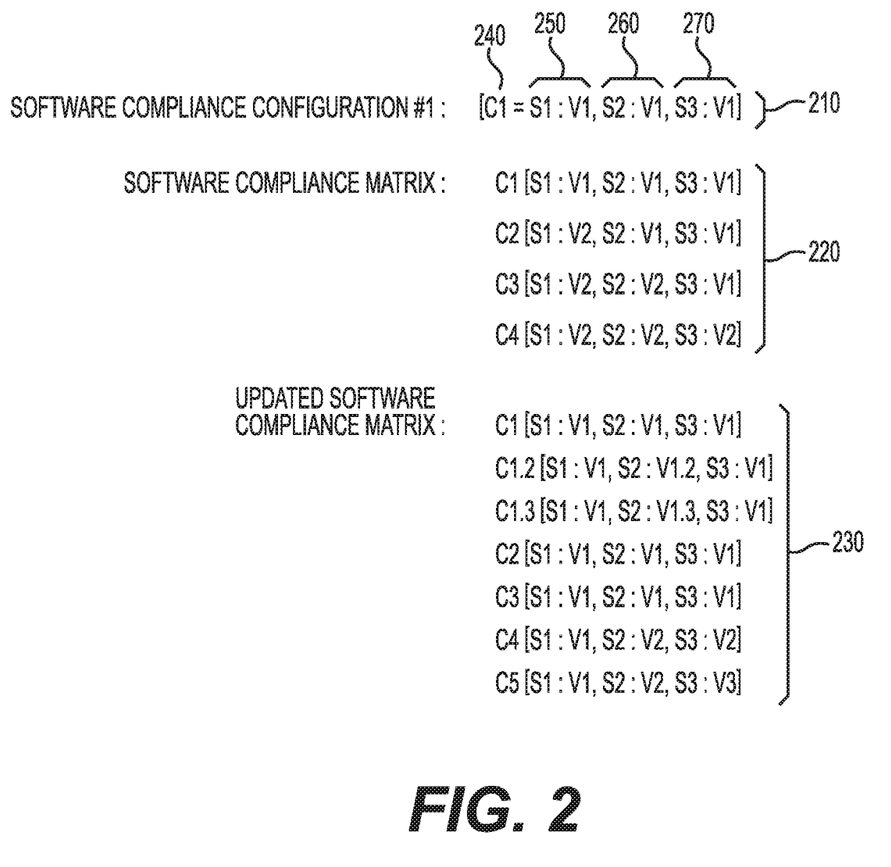
FIG. 2 is an illustration of an example compliance matrix.

With various SDDC elements existing on an SDDC, the interdependencies can quickly become too complex to view on an individual basis. One solution, as shown in FIG. 2, is to create a software compliance configuration 210 for a collection of SDDC elements (and their respective versions) that are compliant with one another. For example, configuration 210 in FIG. 2 shows a configuration identifier 240 (depicted as C1) as well as three pairings 250, 260, 270 of SDDC elements and version numbers. Pairing 250 depicts a first SDDC element (S1) paired with a first version of that element (V1). Pairing 260 depicts a second SDDC element (S2) paired with a first version of that element (V1). Pairing 270 depicts a third SDDC element (S3) paired with a first version of that element (V1).

Configuration 210 represents a combination of compatible SDDC-element/version pairings 250, 260, 270. In some examples, a system administrator can validate the particular combination of pairings 250, 260, 270 reflected by a configuration 210, such as by testing the configuration 210 in a virtualized test environment. Multiple configurations 210 can be stored together in a matrix, such as a compliance matrix 220.

Compliance matrix 220 includes four configurations, labelled C1-C4. Each configuration includes three pairings that relate to SDDC elements S1, S2, and S3. The configurations can be ordered in the matrix to provide context for upgrade decisions. For example, in the compliance matrix 220 of FIG. 2, SDDC element S3 is paired with V1 in configurations C1-C3, but paired with V2 in configuration C4. In one example, this means that if SDDC element S3 is to be upgraded to version V2, SDDC elements S1 and S2 must include versions that match the pairings in configuration C4 (in this case, both V2). On the other hand, configuration C2 indicates that SDDC element S1 can be upgraded to version V2 while elements S2 and S3 remain in version V1. These are merely a few example indications provided by the compliance matrix 220.

FIG. 2 also depicts a modified compliance matrix 230. In this example, some version indicators include sub-version information, such as V1.2 and V1.3. These versions may have been released after the compliance matrix 220 was published. Similarly, a configuration with new versions V3 has been added to the compliance matrix to form the modified compliance matrix 230. The same interdependency rules can apply to the configurations of the modified compliance matrix 230.

When a compliance matrix is generated or modified, it can be copied into a metadata manifest. The metadata manifest can be uploaded to a software depot accessible by an SDDC manager instance running on top of the SDDC. The SDDC manager can poll the software depot and, if a metadata manifest is present in the depot, compare a release number of the metadata manifest to the release number of the metadata manifest currently stored at the SDDC. If the metadata manifest in the depot has a newer release number than the stored manifest, the SDDC can download and replace the metadata manifest stored at the SDDC.

The compliance matrix of FIG. 2 includes generalized variables for different SDDC element types and corresponding versions. The SDDC element types can include any software component executing on an SDDC, such as license inventory and management tools, lifecycle management tools, virtualized networking and security tools, platform services controller tools, server management tools, bare metal hypervisor tools, cloud automation tools, and log management and analytics tools, for example.

Figure 3:
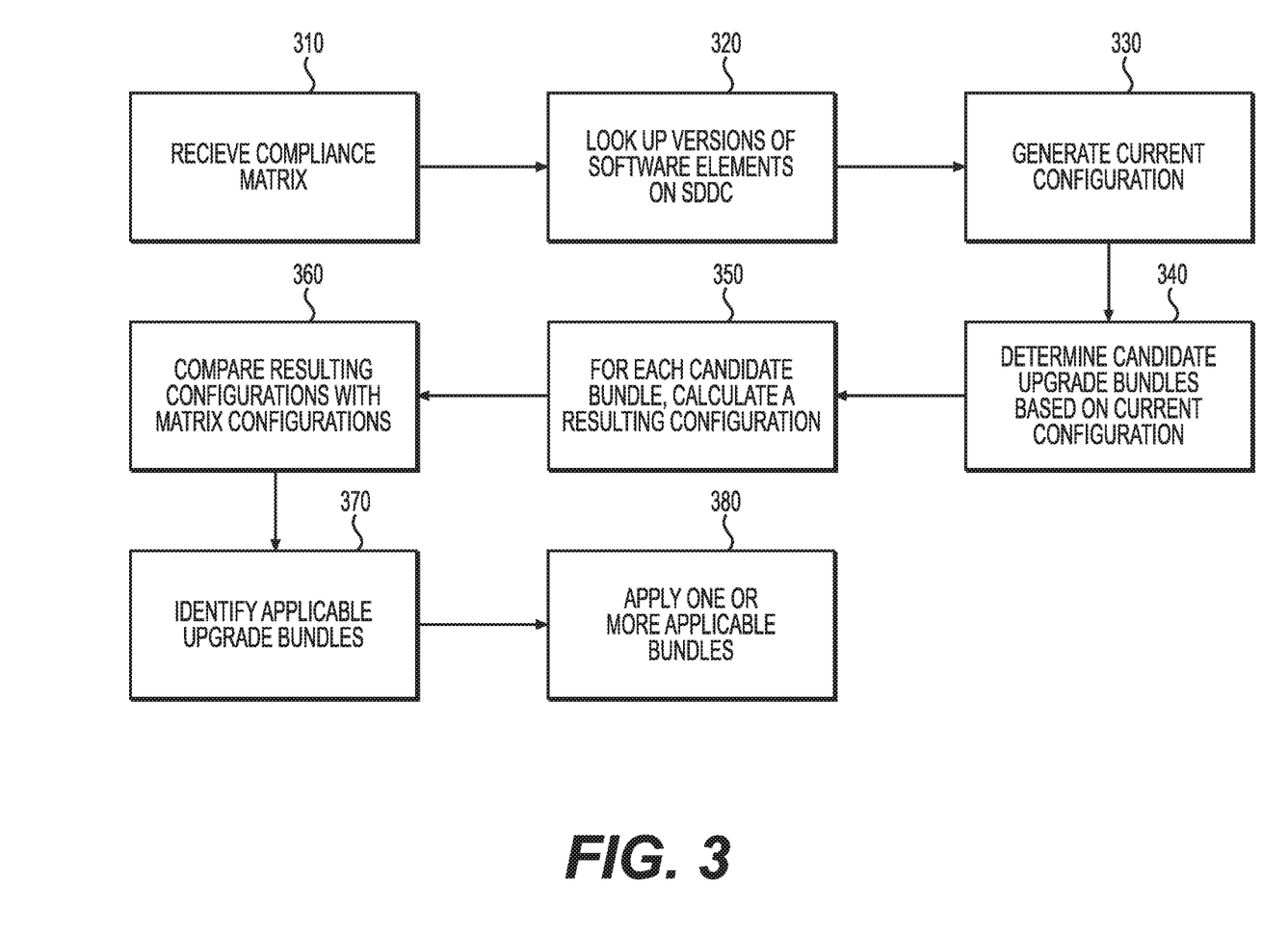
FIG. 3 is a flowchart of an example method for validating a bundle against a compliance matrix.

The compliance matrix of the metadata manifest can guide the process of applying software upgrade bundles by the SDDC manager instance. FIG. 3 provides an example flowchart of the process. At stage 310, the SDDC manager instance can receive the compliance matrix, such as by receiving a metadata manifest as described previously. In one example, different compliance matrices can be sent to different customers, based on which SDDC elements and associated versions are available for a particular customer.

At stage 320, the SDDC manager instance can perform a lookup to determine the SDDC software elements present within the SDDC along with their corresponding versions. This can include querying various orchestrators within the SDDC to request a listing of SDDC software elements and associated versions managed by the orchestrators. This can be performed by making application programming interface ("API") calls to SDDC stacks running the respective orchestrators. Each orchestrator can respond with an identification of any SDDC software elements it manages, along with version information for those elements.

At stage 330, the SDDC manager instance can generate a current configuration based on the information received from stage 320. The configuration can take the same form as the configuration 210 of FIG. 2, including a configuration identification 240 and various pairings 250, 260, 270 of SDDC software elements and corresponding versions. In some examples, the configuration generated at stage 330 will match a configuration entry in the compliance matrix received at stage 310 of the method.

At stage 340, the SDDC manager instance can determine candidate upgrade bundles based on the current configuration generated at stage 330. In one example, the SDDC manager instance has access to a list of upgrade bundles that can potentially apply to an SDDC. For example, the list of upgrade bundles can be the upgrade bundles that have been uploaded to a software depot and are available for download by the SDDC workload instances within the SDDC.

Stage 340 can also include identifying the upgrade bundles that can be applied to the software versions reflected in the current configuration. For example, the current configuration can include pairing S3:V1, indicating that the SDDC currently includes software element S3 with version V1. Identifying upgrade bundles that can be applied to this element would include identifying upgrade bundles that can be applied to element S3, version V1. This process of identifying candidate upgrade bundles can be repeated for each element and version pairing included in the current configuration.

Stage 350 can include, for each candidate upgrade bundle identified at stage 340, calculating a resulting configuration that would hypothetically result from applying the upgrade bundle. For example, an upgrade bundle can upgrade element S3 from version V1 to version V2. The resulting configuration would therefore include pairing S3:V2, to reflect the result of applying the candidate upgrade bundle. In some examples, each candidate upgrade bundle can be used to generate a different resulting configuration at stage 350.

At stage 360, the SDDC manager instance can compare the resulting configurations with the validated configurations contained in the configuration matrix received at stage 310. This stage can include extracting the configurations from the configuration matrix and comparing them to each of the resulting configurations from stage 350. If a resulting configuration does not match any of the configurations in the configuration matrix, that resulting configuration can be discarded or otherwise marked as invalid. If a resulting configuration matches a configuration in the configuration matrix, then that resulting configuration can be identified or marked as a valid configuration.

Stage 370 can include identifying applicable upgrade bundles based on the valid resulting configurations identified at stage 360. For example, the SDDC manager instance can parse a valid resulting configuration and identify the element-version pairings within the configuration. For each of those pairing, the SDDC manager instance can identify a particular upgrade bundle that can be applied to upgrade an element to the version in the resulting configuration pairing. If a resulting configuration includes five pairings, for example, the SDDC manager instance can identify up to five upgrade bundles that could be applied to achieve that configuration.

Stage 380 can include selecting a configuration to be applied, identifying the applicable upgrade bundles required to achieve that configuration, and applying the applicable upgrade bundles. Stages 340-380 can be repeated to apply multiple iterations of upgrades to multiple SDDC elements. In this way, upgrades can be validated at each step, ensuring that the resulting software configurations work properly without causing unwanted issues.

As the number of SDDC software elements in an SDDC increases, the complexity associated with upgrading the SDDC software elements can increase exponentially. In additional to each SDDC software element potentially requiring its own upgrades, those upgrades can potentially break compatibility with any of the other SDDC software elements that are present in the system. In some examples, an upgraded SDDC software element can break compatibility with another SDDC software element executing within a different SDDC stack, such as within an SDDC workload instance. In some examples, each of these SDDC software elements utilize a different orchestrator that lack sufficient communication with one another to avoid compatibility issues. In these types of examples, a simple compliance matrix might not resolve all potential issues due to communication breakdowns between different components.

To resolve upgrade compatibility issues across different SDDC stacks, a super bundle can be provided to the SDDC manager to implement across the SDDC. A super bundle can include a plurality of bundles, such as the upgrade bundles described above. A super bundle can also include a metadata manifest that provides information for installing the bundles within the super bundle, such as by providing sequence information for each of the bundles. In some examples, the term "super bundle" refers to the collection of bundles themselves, with or without the metadata manifest. In other examples, the term refers to the metadata manifest describing the plurality of bundles, with or without including the bundles themselves.

Figure 4:
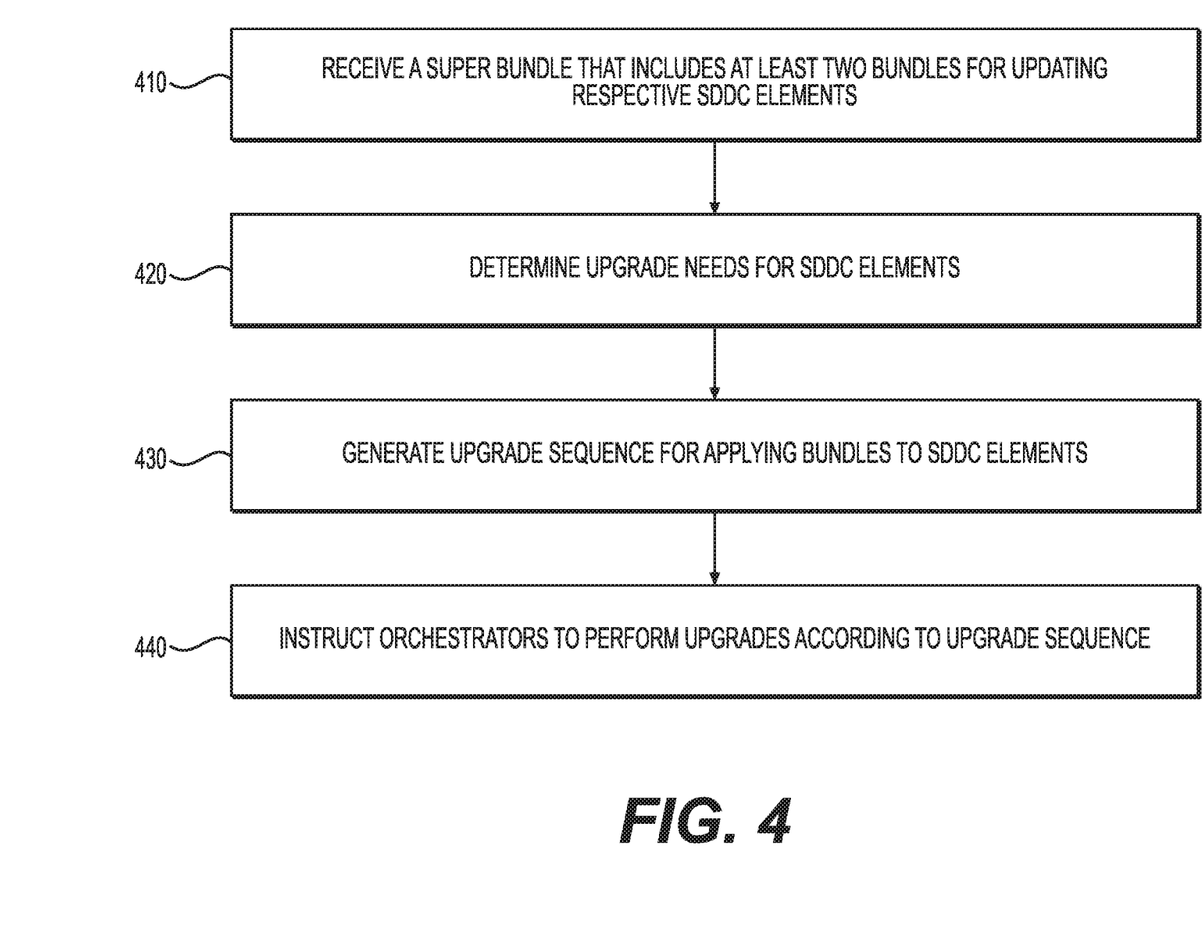
FIG. 4 is a flowchart of an example method for receiving and implementing a super bundle.

A super bundle can be generated at a master orchestrator with knowledge of potential compatibility issues across platforms or SDDC stacks. FIG. 4 provides a basic flowchart for handling a super bundle. At stage 410, an SDDC manager can receive a super bundle that includes at least two bundles for updating respective SDDC elements. The term "including" can mean that the upgrade bundles are within the same file, or group of files, as the super bundle, or it can mean that the super bundle includes information regarding those bundles in the metadata manifest. The SDDC elements can be software elements executing within different SDDC stacks, such as within first and second SDDC workload instances.

Stage 420 can include determining upgrade needs for the SDDC elements. This can include, for example, querying one or more orchestrators to determine whether the orchestrators manage any SDDC elements that need to be, or could be, upgraded. In this example, the super bundle includes at least a first upgrade bundle and a second upgrade bundle, the first upgrade bundle identifying a first SDDC element and the second upgrade bundle identifying a second SDDC element. The first and second SDDC elements can be managed by the same orchestrator in some examples. In the example of FIG. 4, the first and second SDDC elements can be managed by a first orchestrator and second orchestrator, respectively. The first orchestrator can manage a first SDDC workload instance while the second orchestrator manages a second SDDC workload instance, for example.

The query at stage 420 can include making an API call from the SDDC manager to each of the first and second orchestrators. The API call can request a listing of SDDC elements managed by each orchestrator, along with the current version of each of those SDDC elements. The SDDC manager can receive the listing of elements and corresponding versions and, using that information, determine whether any upgrades are needed. Upgrade needs can be determined automatically by the SDDC manager, such that all SDDC elements are maintained in the most recent version that maintains compatibility across the SDDC. In another example, upgrade needs can be determined by input from an administrator, such as input that identifies target versions of various SDDC elements within the SDDC. In that example, an upgrade need can arise for any SDDC elements that are not yet updated to the target version identified by the administrator.

Stage 430 can include generating an upgrade sequence for applying at least two bundles identified by the super bundle, such as the first and second upgrade bundles mentioned previously. This stage can include, for each SDDC element identified at stage 420 as requiring an upgrade, identifying a sequence number within the metadata manifest of the super bundle. This can include parsing the metadata manifest and extracting the sequence number for each relevant bundle. In one example, the metadata manifest provides sequence numbers for four bundles, including the first and second bundle. The sequence number of the first bundle can be "3," while the sequence number of the second bundle is "1." In this example, the remaining bundles (third and fourth) do not correspond to upgrade needs identified at stage 420.

Based on this sequence information, the SDDC manager can generate a sequence that includes the second upgrade bundle first, followed by the first upgrade bundle. This sequence is based on the respective sequence numbers (1 and 3) in the manifest. The sequence omits the sequence numbers associated with bundles for which no upgrades are required.

At stage 440, the SDDC manager can instruct the relevant orchestrators to perform upgrades according to the upgrade sequence. In one example, the SDDC manager instructs the second orchestrator to upgrade the second SDDC element using the relevant upgrade bundle for that element. After the second orchestrator confirms successful installation, the SDDC manager can instruct the first orchestrator to upgrade the first SDDC element using the relevant upgrade bundle for that element. In some examples, the orchestrators can be provided the sequence information and can communicate amongst themselves to confirm successful installations and continue the process. In other examples, the SDDC manager can manage each step of the installation process and request confirmations, as described previously.

An example super bundle metadata manifest is provided below. The example manifest includes a super bundle ID and a variety of upgrade bundles (referred to as bundle elements within the manifest). In this example, each upgrade bundle is part of a sub-bundle. Sub-bundles can be organized such that each sub-bundle applies to a distinct orchestrator or SDDC stack, in some examples. Each upgrade bundle includes its own bundle ID, description, software type, version, and a sequence number.

```
{
  "superBundleId": "c1e1e9e9-1e48-4ba5-91b4-017813201fc4",
  "SubBundles": [
    {
      "bundleId": "e9ff0050-2a28-4194-832d-3e0e3935dae9",
      "description": "Bundle Type A",
      "bundleLocation": " ",
      "bundleChecksum": "5f83ea392fdd361f24d648856ecb00f3",
      "metadata": "Some meta data",
      "version": "504.5.110.00000-7105694",
      "bundleElements": [
        {
          "bundleElementId":
            "15860330-6377-4767-96fd-876bb8fc93a4",
          "softwareType": "XYZ",
          "description": "Some description",
          "version": "504.5.110.00000-7105694",
          "sequenceNumber": 2,
        },
        {
          "bundleElementId":
            "15860330-6377-4767-96fd-876bb8fc93a5",
          "softwareType": "PQR",
          "description": "Some description",
          "version": "504.5.110.00000-7105694",
          "sequenceNumber": 4,
        },
        {
          "bundleElementId":
            "15860330-6377-4767-96fd-876bb8fc93a6",
          "softwareType": "ABC",
          "description": "Some description",
          "version": "504.5.110.00000-7105694",
          "sequenceNumber": 5,
        }
      ],
      "releaseDate": 1512329914000,
    },
    {
      "bundleId": "a382847b-c88d-49f3-8287-baf8152cfee6",
      "description": "Bundle Type B",
      "bundleLocation":
      "bundleChecksum": "e0a07d709b90974f9c678e4f5f1a1b63",
      "metadata": "Some meta data",
      "version": "504.5.110.00000-7105700",
      "bundleElements": [
        {
          "bundleElementId":
            "15860330-6377-4767-96fd-876bb8fc93a7",
          "softwareType": "DEF",
          "description": "Some description",
          "version": "504.5.110.00000-7105694",
          "sequenceNumber": 1,
        },
        {
          "bundleElementId":
            "15860330-6377-4767-96fd-876bb8fc93a8",
          "softwareType": "GHI",
          "description": "Some description",
          "version": "504.5.110.00000-7105694",
          "sequenceNumber": 3,
        },
        {
          "bundleElementId":
            "15860330-6377-4767-96fd-876bb8fc93a9",
          "softwareType": "JKL",
          "description": "Some description",
          "version": "504.5.110.00000-7105694",
          "sequenceNumber": 6,
        }
      ],
      "releaseDate": 151232991400
    }
  ]
}
```

Figure 5:
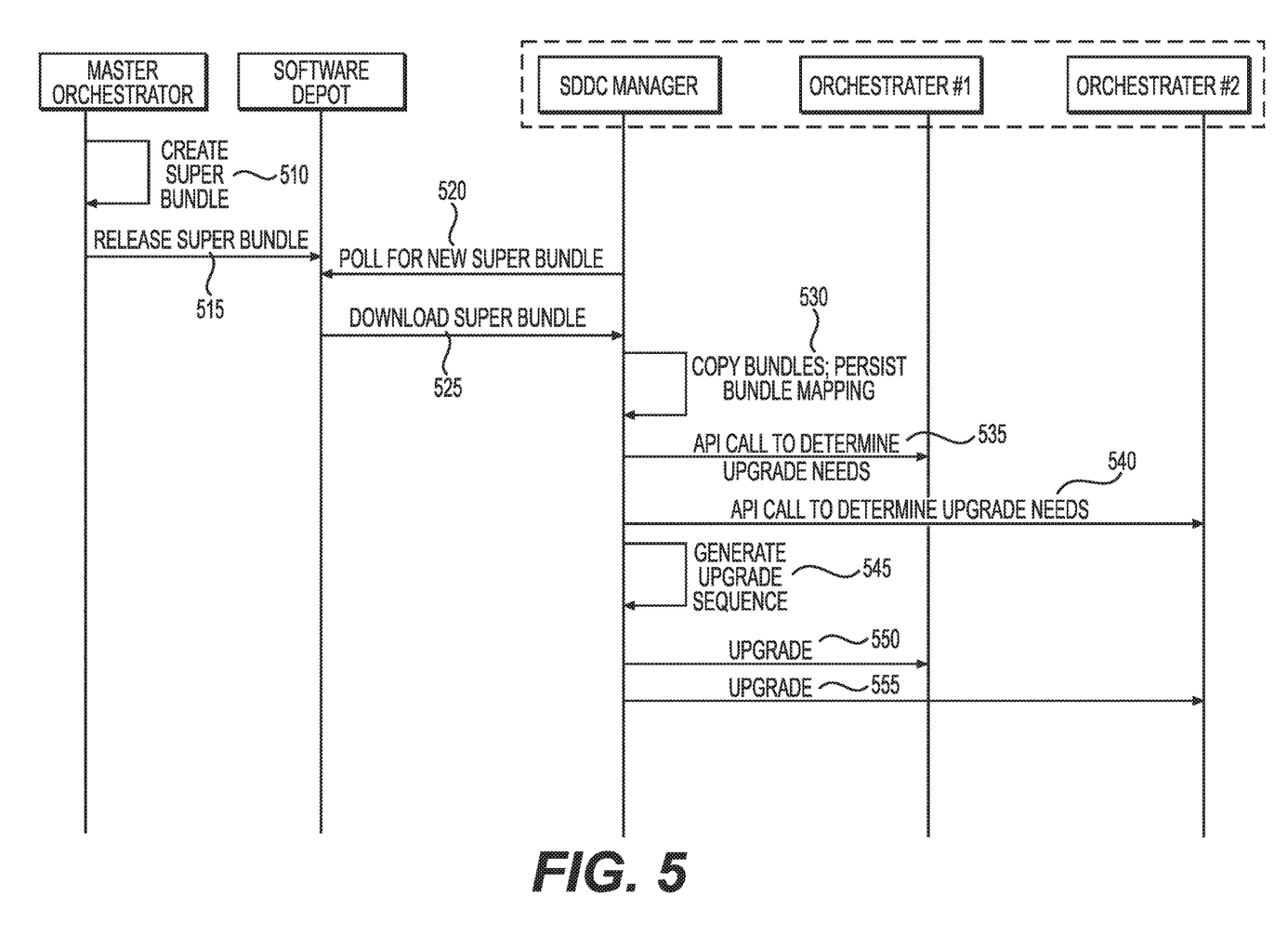
FIG. 5 is a sequence diagram of an example method for creating and implementing a super bundle.

As explained above, the various sequence numbers can be used to determine an upgrade sequence for the SDDC. FIG. 5 provides a sequence diagram showing more detail associated with an example method of performing upgrades using a super bundle.

Turning to FIG. 5, stage 510 can include creating a super bundle at the master orchestrator. The master orchestrator can be an entity, or group within an entity, that provides the overall SDDC infrastructure for the SDDC described herein. In one example, the master orchestrator is VMWARE, INC. In a more specific example, the master orchestrator is a software development and support group within VMWARE, INC. In other examples, the master orchestrator can be a computing machine implementing machine-learning techniques and various rules to create the super bundle. In some examples, the super bundle created at stage 510 is the example super bundle present in the text above. The upgrade bundles referenced within the super bundle can already exist, having been created previously. Creating the super bundle at stage 510 can therefore include creating the metadata manifest.

After creating the super bundle, the master orchestrator can release the super bundle to a software depot at stage 515. This stage can include, for example, transmitting the metadata manifest to a software depot accessible to multiple SDDCs. The software depot can also be used to store the individual upgrade bundles. Each SDDC can be configured to poll for new information within the software depot. For example, at stage 520, the SDDC manager can poll the software depot. The SDDC manager can then determine if the super bundle stored in the software depot has not yet been received. To make this determination, the SDDC manager can determine whether a super bundle exists within a persistent storage location of the SDDC manager, and if so, whether that super bundle includes an ID that matches the ID of the super bundle in the software depot. If the super bundle in the software depot has a new ID number, for example, the SDDC manager can download the super bundle at stage 525. In some examples, this stage can include downloading the individual upgrade bundles referenced by the super bundle.

At stage 530, the SDDC manager can copy the bundle information from the metadata manifest and save the information in a persistent storage location. In some examples, the super bundle can include sub-bundles, such as "Bundle Type A" and "Bundle Type B" identified in the super bundle above. The sub-bundles can include collections of upgrade bundles. For example, one sub-bundle can include bundles relating to an SDDC workflow stack, while another sub-bundle includes bundles relating to a different type of SDDC stack. Copying the bundle information at stage 530 can include copying the super bundle's metadata manifest, or portions of the manifest, to a persistent storage location. Stage 530 can also include storing bundle mapping information, such as the metadata regarding the bundles within the sub-bundles, including ID numbers, descriptions, versions, software types, and sequence numbers.

At stages 535 and 540, the SDDC manager can make API calls to the first and second orchestrators to determine upgrade needs for the SDDC components managed by those orchestrators. The API calls can each request a listing of SDDC elements managed by the respective orchestrator, along with the current versions of each of those SDDC elements. The orchestrators can retrieve the information from an accessible storage location. In some examples, the orchestrators parse the metadata manifests associated with the upgrade bundles most recently installed.

The SDDC manager can receive the listing of elements and corresponding versions and, using that information, determine whether any upgrades are needed. Upgrade needs can be determined automatically by the SDDC manager, such that all SDDC elements are maintained in the most recent version that maintains compatibility across the SDDC. In another example, upgrade needs can be determined by input from an administrator, such as input that identifies target versions of various SDDC elements within the SDDC. In that example, an upgrade need can arise for any SDDC elements that are not yet updated to the target version identified by the administrator.

At stage 545, the SDDC manager can generate an upgrade sequence that relates to implementing the super bundle. This stage can include, for each SDDC element identified at stages 553 or 340 as requiring an upgrade, identifying a sequence number within the metadata manifest of the super bundle. This can include parsing the metadata manifest and extracting the sequence number for each relevant bundle. Based on the sequence information, the SDDC manager can generate an order for applying the relevant bundles within the super bundle. In some examples, all of the bundles within the super bundle are included in the sequence. But when fewer bundles are required based on the upgrade needs, the sequence can include a subset of the bundles within the super bundle.

At stages 550 and 555, the SDDC manager can instruct the first and second orchestrator, respectively, to upgrade relevant SDDC elements. The instruction can include an identification of a storage location that includes the relevant upgrade bundles. In another example, the instruction can include further instructions for retrieving the upgrade bundles from the software depot. The orchestrators can retrieve the relevant upgrade bundles and apply them in the order designated by the SDDC manager. In some examples, the orchestrators can send a confirmation message to the SDDC manager upon successful installation of the upgrade bundles.

In some examples, the SDDC manager can cause the orchestrators to apply the upgrade bundles in a step-by-step fashion in order to maintain an appropriate sequence. For example, the SDDC manager can instruct a first orchestrator to apply a first upgrade bundle. Upon receiving confirmation of successful installation, the SDDC manager can then instruct a second orchestrator to apply a second upgrade bundle. Upon receiving confirmation, the SDDC manager can then instruct the first orchestrator to apply a third upgrade bundle. In this way, the SDDC manager can implement a sequence across multiple orchestrators that may not be able to communicate with one another. In an example where the orchestrators can communicate with each other, the SDDC manager can instruct them to carry out the sequencing by exchanging confirmation messages directly.

In another example, the SDDC manager can attempt to apply the bundles at stages 550 and 555 without regard to what SDDC elements and versions exist under management by the first and second orchestrators. The orchestrators can ignore upgrade requests that do not apply to the SDDC elements actually available to the respective orchestrator.

Figure 6:
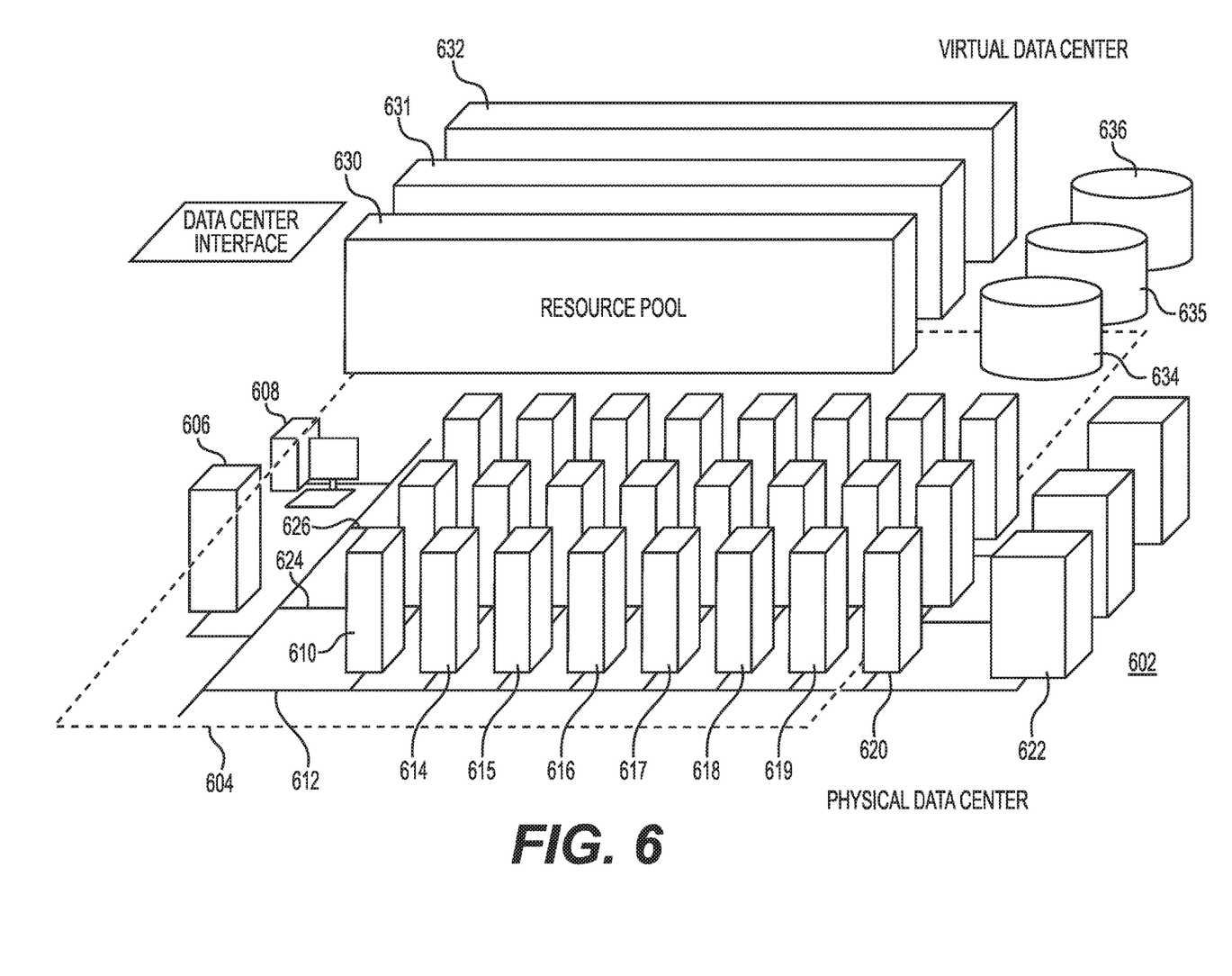
FIG. 6 is an illustration of an example virtual datacenter for performing the various methods described herein.

FIG. 6 provides an illustration of a simplified SDDC that can perform the various methods described herein. Specifically, FIG. 6 illustrates virtual data centers provided as an abstraction of underlying physical-data-center hardware components. In some examples, the virtualized data center is considered an SDDC. A physical data center 602 is shown below a virtual-interface plane 604. The physical data center consists of a virtual-infrastructure management server ("VI-management-server") 606 and any of various different computers, such as PCs 608, on which a virtual-data-center management interface may be displayed to system administrators and other users. The interface can be a software-based control system, such as VMWARE VCLOUD DIRECTOR.

The physical data center additionally includes a number of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple virtual machines. Different physical data centers may include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability. It can migrate virtual machines to most effectively utilize underlying physical hardware resources, to replace virtual machines disabled by physical hardware problems and failures, and to ensure that multiple virtual machines supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The SDDC of FIG. 6 can include multiple SDDC instances executing within the SDDC. For example, the SDDC can include an SDDC manager instance that operates on a standalone SDDC stack within the overall SDDC. Similarly, the SDDC can include an SDDC workflow instance that operates on another SDDC stack. The SDDC can include multiple SDDC manager instances and SDDC workflow instances, as described above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method comprising stages executed by a hardware-based processor for lifecycle orchestration in a Software-Defined Data Center (SDDC), the stages comprising:
    receiving, at an SDDC manager, a super bundle that identifies multiple SDDC elements and corresponding versions for installation, the super bundle comprising a plurality of files including:
        a first upgrade bundle file of a plurality of upgrade bundles in the super bundle, wherein the first upgrade bundle file, when applied to a first SDDC element, upgrades the first SDDC element to a first version;
        a second upgrade bundle file of the plurality of upgrade bundle files in the super bundle, wherein the second upgrade bundle file, when applied to a second SDDC element, upgrades the second SDDC element to a second version; and
        a metadata file comprising sequence information for the plurality of upgrade bundle files;
    making application programming interface (API) calls from the SDDC manager to first and second orchestrators, respectively, to identify upgrade needs for the first and second SDDC elements;
    generating, by the SDDC manager, a bundle sequence for applying a subset of the plurality of upgrade bundle files in the super bundle, the subset including the first and second upgrade bundle files and omitting at least one different upgrade bundle file from the super bundle, wherein the bundle sequence is generated based on both the sequence information in the metadata file and information received in response to the API calls; and
    based on the bundle sequence, causing the first orchestrator to apply the first upgrade bundle file before the second orchestrator applies the second upgrade bundle file, wherein applying the first upgrade bundle file includes validating the first version of the first SDDC element against a compliance matrix to check interoperability with current versions of other SDDC elements.

2. The method of claim 1, wherein determining the bundle sequence comprises extracting the sequence information from metadata file of the super bundle to determine which of the first and second upgrade bundle files to apply first.

3. The method of claim 1, further comprising identifying a third upgrade bundle of the super bundle that should not be applied based on the identified upgrade needs.

4. The method of claim 1, wherein the compliance matrix includes a plurality of entries indicating a valid combination of SDDC elements and corresponding versions.

5. The method of claim 1, wherein each of the first and second upgrade bundles includes a metadata manifest with information used to validate the respective upgrade bundle with the compliance matrix.

6. The method of claim 1, further comprising, after upgrading the first SDDC element to the first version by the first orchestrator using the first upgrade bundle file, upgrading the second SDDC element to the second version by the second orchestrator using the second upgrade bundle file.

7. A non-transitory, computer-readable medium containing instructions that, when executed by a hardware-based processor, performs stages for lifecycle orchestration in a Software-Defined Data Center (SDDC), the stages comprising:
    receiving, at an SDDC manager, a super bundle that identifies multiple SDDC elements and corresponding versions for installation, the super bundle including:
        a first upgrade bundle of a plurality of upgrade bundles in the super bundle, wherein the first upgrade bundle file, when applied to a first SDDC element, upgrades the first SDDC element to a first version;
        a second upgrade bundle of the plurality of upgrade bundle files in the super bundle, wherein the second upgrade bundle file, when applied to a second SDDC element, upgrades the second SDDC element to a second version; and
        sequence information for the plurality of upgrade bundle file, the sequence information comprising a plurality of sequential numbers indicating the order in which the first and second upgrade bundles should be applied;
    making application programming interface (API) calls from the SDDC manager to first and second orchestrators, respectively, to identify upgrade needs for the first and second SDDC elements;
    generating, by the SDDC manager, a bundle sequence for applying a subset of the plurality of upgrade bundle files in the super bundle, the subset including the first and second upgrade bundle files and omitting at least one different upgrade bundle file from the super bundle, wherein the bundle sequence is generated based on both the sequence information and information received in response to the API calls; and
    based on the bundle sequence, causing the first orchestrator to apply the first bundle before the second orchestrator applies the second bundle, wherein applying the first bundle includes validating the first version of the first SDDC element against a compliance matrix to check interoperability with current versions of other SDDC elements.

8. The non-transitory, computer-readable medium of claim 7, wherein determining the bundle sequence comprises extracting the sequence information from metadata of the super bundle to determine which of the first and second bundle to apply first.

9. The non-transitory, computer-readable medium of claim 7, the stages further comprising identifying a third upgrade bundle of the super bundle that should not be applied based on the identified upgrade needs.

10. The non-transitory, computer-readable medium of claim 7, wherein the compliance matrix includes a plurality of entries indicating a valid combination of SDDC elements and corresponding versions.

11. The non-transitory, computer-readable medium of claim 7, wherein each of the first and second upgrade bundles includes a metadata manifest with information used to validate the respective upgrade bundle with the compliance matrix.

12. The non-transitory, computer-readable medium of claim 7, the stages further comprising, after upgrading the first SDDC element to the first version by the first orchestrator using the first upgrade bundle, upgrading the second SDDC element to the second version by the second orchestrator using the second upgrade bundle.

13. A system for lifecycle orchestration in a Software-Defined Data Center (SDDC), comprising:
- a memory storage including a non-transitory, computer-readable medium comprising instructions; and
- a computing device including a hardware-based processor that executes the instructions to carry out stages comprising:
  - receiving, at an SDDC manager, a super bundle that identifies multiple SDDC elements and corresponding versions for installation, the super bundle including:
    - a first upgrade bundle of a plurality of upgrade bundles in the super bundle, wherein the first upgrade bundle file, when applied to a first SDDC element, upgrades the first SDDC element to a first version;
    - a second upgrade bundle of the plurality of upgrade bundle files in the super bundle, wherein the second upgrade bundle file, when applied to a second SDDC element, upgrades the second SDDC element to a second version; and
    - sequence information for the plurality of upgrade bundle files;
  - making application programming interface (API) calls from the SDDC manager to first and second orchestrators, respectively, to identify upgrade needs for the first and second SDDC elements;
  - generating, by the SDDC manager, a bundle sequence for applying a subset of the plurality of upgrade bundle files in the super bundle, the subset including the first and second upgrade bundle files and omitting at least one different upgrade bundle file from the super bundle, wherein the bundle sequence is generated based on both the sequence information and information received in response to the API calls; and
  - based on the bundle sequence, causing the first orchestrator to apply the first bundle before the second orchestrator applies the second bundle, wherein applying the first bundle includes validating the first version of the first SDDC element against a compliance matrix to check interoperability with current versions of other SDDC elements.

14. The system of claim 13, wherein determining the bundle sequence comprises extracting the sequence information from metadata of the super bundle to determine which of the first and second bundle to apply first.

15. The system of claim 13, the stages further comprising identifying a third upgrade bundle of the super bundle that should not be applied based on the identified upgrade needs.

16. The system of claim 13, wherein each of the first and second upgrade bundles includes a metadata manifest with information used to validate the respective upgrade bundle with the compliance matrix.

17. The system of claim 13, the stages further comprising, after upgrading the first SDDC element to the first version by the first orchestrator using the first upgrade bundle, upgrading the second SDDC element to the second version by the second orchestrator using the second upgrade bundle.

\* \* \* \* \*